(12) United States Patent
Frank et al.

(10) Patent No.: US 8,127,197 B2
(45) Date of Patent: Feb. 28, 2012

(54) METHOD AND APPARATUS FOR RADIO LINK CONTROL PADDING FOR ENHANCED GENERAL PACKET RADIO SERVICE

(75) Inventors: Colin D Frank, Park Ridge, IL (US); Sandeep H Krishnamurthy, Mundelein, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 992 days.

(21) Appl. No.: 12/047,456

(22) Filed: Mar. 13, 2008

(65) Prior Publication Data

US 2009/0232158 A1    Sep. 17, 2009

(51) Int. Cl.
 *H03M 13/00* (2006.01)
(52) U.S. Cl. .................. 714/755; 370/208; 370/310
(58) Field of Classification Search .................. 714/755; 370/208, 310
See application file for complete search history.

(56) References Cited

U.S. PATENT DOCUMENTS

| | | | |
|---|---|---|---|
| 6,625,113 B1 * | 9/2003 | Cupo et al. | 370/208 |
| 2008/0225982 A1 * | 9/2008 | Chrabieh et al. | 375/299 |
| 2009/0086657 A1 * | 4/2009 | Alpert et al. | 370/310 |

* cited by examiner

*Primary Examiner* — Sam Rizk
(74) *Attorney, Agent, or Firm* — Gary J. Cunningham (57) ABSTRACT

A method (300) for radio link control padding is shown. In its simplest form, it can include the steps of: providing (310) N bytes of data from a base station; interleaving (320) the N bytes of data using a turbo-interleaver; pre-pending (330) K bytes of zero padding; and passing (340) the interleaved N bytes and the pre-pended K bytes to a convolutional encoder to provide an output comprising a parity sequence adapted for further processing and providing a radio link control block for an enhanced general packet radio service 2-B mobile device. The method (300) is particularly adapted for use with Chase and incremental redundancy combining, which can provide fast, reliable and efficient general packet radio service to a 2-B mobile device.

17 Claims, 7 Drawing Sheets

METHOD AND APPARATUS FOR RADIO LINK CONTROL PADDING FOR ENHANCED GENERAL PACKET RADIO SERVICE

BACKGROUND

1. Field

The present disclosure is directed to wireless communication devices. More particularly, the present disclosure is directed to a method and apparatus for radio link control padding compatible with turbo codes and Chase and incremental redundancy combining.

2. Introduction

Wireless communication devices used in today's society include mobile phones, personal digital assistants, portable computers, and various other electronic communication devices. New wireless technologies are continually being developed to support increasing demands for better reliability during voice calls, for improved throughput during Internet and other data connections, and for other desirable features. These new wireless technologies are often designed to accommodate older wireless technologies so users of older wireless communication devices can still use their devices on newer networks and, conversely, so that users of newer wireless communication devices can use their devices on older networks.

Unfortunately, such backward compatibility may hinder the full potential of new wireless technologies. For example, an older mobile phone using an older technology, such as Enhanced General Packet Radio Service (EGPRS), may operate on the same channel as a newer mobile phone using a newer variant of EGPRS technology, such as Enhanced General Packet Radio Service 2-B (EGPRS2-B). To ensure proper communications for the older EGPRS mobile phone, however, the newer EGPRS2-B mobile phone may be forced to use the older EGPRS technology for its communications and may accordingly experience reduced performance. Such is the case when both an EGPRS mobile device and an EGPRS2-B mobile device are assigned to a same uplink time slot by a base station serving both mobile devices.

There have been proposals for multiplexing EGPRS2-B mobiles with EGPRS2-A mobiles and EGPRS mobiles on the same uplink time slot. Currently, at least two methods have been proposed for multiplexing EGPRS2-B and EGPRS2-A mobiles. Specifically, when simultaneously sending data to the EGPRS2-B mobile and USF to the EGPRS2-A mobile, the network could either: (i) use MCS-2 or MCS-3, in accordance with the radio link control (RLC) family in use when not transmitting uplink state flag (USF) information to the EGPRS2-A mobile; or (ii) use only EGPRS2-A modulation and coding schemes within the TBF whenever the EGPRS2-B mobile is multiplexed with an EGPRS2-A mobile in the same uplink time slot. These same two options exist for an EGPRS2-B mobile that is multiplexed with an EGPRS mobile in the same time slot.

However, there is an additional restriction on (ii) that only DAS-5, DAS-6, or DAS-7 can be used when simultaneously sending data to the EGPRS2-B mobile and USF to the EGPRS mobile.

Both of the above proposals have significant deficiencies. The use of (i) is unattractive as the data rates of MCS-2 and MCS-3 are very low (11.2 and 14.8 kbps, respectively) and the RLC block must be split over multiple radio blocks. Further, neither incremental redundancy nor Chase combining can be used to combine MCS-2 and MCS-3 retransmissions of RLC blocks with previous transmissions using DBS 5-12. Likewise, the second proposal (ii) is unattractive in that it reduces the peak achievable rate from 118.4 kbps for DBS-12 to 98.4 kbps for DAS-12. Furthermore, the throughput as a function of signal-to-noise ratio is somewhat better for the DBS modulation and coding schemes than it is for the DAS modulation coding schemes, and this performance disparity will increase in the event that a second wider bandwidth pulse shape is standardized for or implemented in EGPRS2-B.

In GERAN #36, there was a proposal to allow the EGPRS2-B mobile to switch between EGPRS2-B and EGPRS2-A modulation and coding schemes within the Temporary Block Flow (TBF). And expanding, it was suggested that both DAS 5-12 and EGPRS modulation and coding schemes MCS 5-9 could be allowed within the EGPRS2-B TBF. Disadvantageously, however, Chase and incremental redundancy combining is not currently possible between radio blocks encoded using MCS 5-9 and radio blocks encoded using DAS and DBS modulation and coding schemes.

In order to improve the uplink state flag (USF) multiplexing efficiency between EGPRS2-B and EGPRS2-A and/or EGPRS, it would be desirable that, whenever possible, turbo codes and incremental redundancy HARQ be supported when signaling USF information to the EGPRS2-A or EGPRS mobile within the EGPRS2-B TBF. Towards this end, it is proposed in this disclosure, that new padded modulation and coding schemes DAS-7 pad, DAS-10 pad, and DAS-12 pad be defined and implemented within the EGPRS2-B TBF. These modulation and coding schemes are compatible with HARQ and can be efficiently multiplexed with DBS-6, DBS-10, and DBS-12. Furthermore, these new padded modulation and coding schemes add minimal additional complexity to the EGPRS2-A and EGPRS2-B mobiles.

Thus, there is a need for methods and apparatus for providing improved performance when a newer, backward-compatible wireless device, such as EGPRS2-B, a less capable, non-forward-compatible wireless device, such as EGPRS2-A, and an older, non-forward-compatible wireless device, such as EGPRS, must co-exist and interoperate in a system.

BRIEF DESCRIPTION OF THE DRAWINGS

In order to describe the manner in which advantages and features of the disclosure can be obtained, various embodiments will be illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which:

FIG. 5 shows an implementation of convolutional encoding for MCS-8;

DETAILED DESCRIPTION

Figure 1:
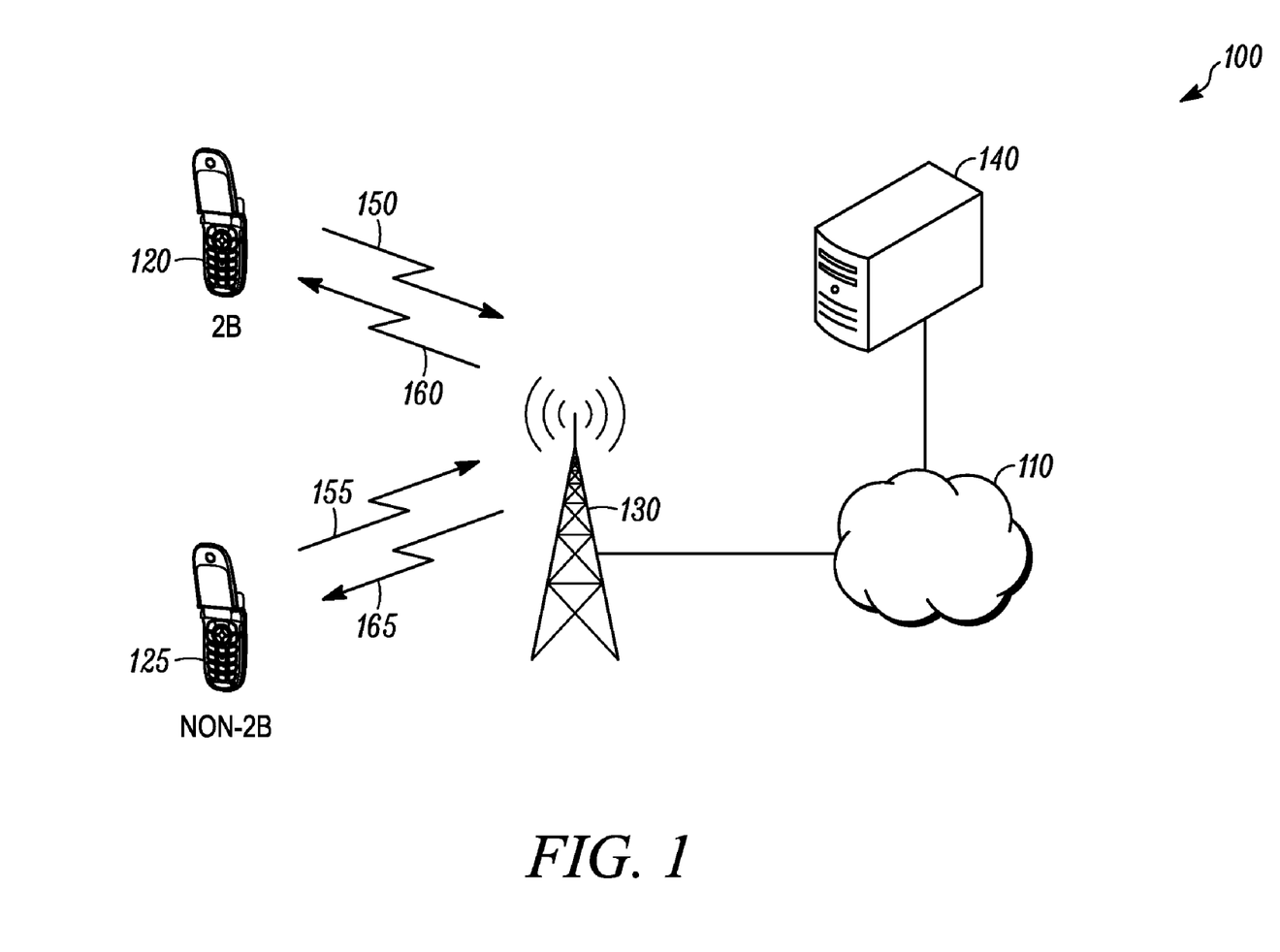
FIG. 1 illustrates an example diagram of a system in accordance with one embodiment.

FIG. 1 is an example block diagram of a system 100 according to one embodiment. The system 100 can include a network 110, terminals 120 and 125 such as mobile devices, a base station 130, and a network controller 140. The terminals 120, 125 may be wireless communication devices, such as a wireless telephone, a cellular telephone, a personal digital assistant, a pager, a personal computer, a selective call receiver, or any other device that is capable of sending and receiving communication signals on a network including a radio access network. The terminals 120, 125 can send uplink signals 150, 155 and receive downlink signals 160, 165. In this example, the terminal 120 is an EGPRS2-B mobile device that uses EGPRS2-B technology and the terminal 125 is an EGPRS non-2-B mobile device that uses EGPRS technology that is not EGPRS2-B. An EGPRS non-2-B mobile device may use EGPRS or EGPRS2-A technology.

In this example embodiment, the network controller 140 is connected to the network 110. The network controller 140 may be located at a base station, at a radio network controller, or anywhere else in the network 110. The network 110 may include any type of network that is capable of sending and receiving signals, such as wired or wireless signals. Furthermore, the network 110 may include more than one network and may include a plurality of different types of networks. Thus, the network 110 may include a plurality of data networks, a plurality of telecommunications networks, a combination of data and telecommunications networks, and other like communication systems capable of sending and receiving communication signals.

According to a related embodiment, for General Packet Radio Service (GPRS) and EGPRS, Uplink State Flags (USFs) can be transmitted on the downlink 160, 165 and used by a base station to inform a mobile device of permission to transmit on a subsequent uplink time slot. Based on GPRS and EGPRS technology, every uplink time slot can be associated with a downlink time slot. If a mobile device is assigned to a particular uplink time slot, it can monitor the USF transmitted on the corresponding downlink time slot for a notification that it is permitted to transmit during a later uplink time slot. On the downlink, the USF and one or more encoded packet data blocks can be transmitted together; however, the USF and the packet data blocks may not be intended for the same mobile device. The USF may be intended to grant uplink permission to a first mobile device, while the encoded packet data blocks may be intended for a second mobile device.

Up to eight mobile devices can be assigned to a particular uplink time slot, and thus there can be eight possible values of the USF. Accordingly, when a mobile device is assigned to a particular uplink time slot, it is also allocated a particular value of USF, which can be used to indicate a grant of permission to transmit on the next corresponding uplink time slot. Two mobile devices can be "USF multiplexed" if they are assigned to the same uplink time slot.

When GPRS and EGPRS mobile devices are USF-multiplexed on the same time slot, there may be a problem in that the GPRS terminal cannot read the EGPRS USF if any of the EGPRS modulation and coding schemes MCS 5-9 are used. Thus, if the network intends to send packet data blocks to the EGPRS mobile device and a USF to the GPRS mobile device during the same downlink time slot, EGPRS one of the modulation and coding schemes MCS 1-4 must be used to transmit the packet data blocks. This can reduce system throughput on the downlink since EGPRS modulation and coding schemes MCS 5-9 use 8PSK (3 code symbols per modulation symbol), while the EGPRS coding schemes MCS 1-4 all use GMSK (1 code symbol per modulation symbol). Thus, when transmitting packet data blocks to the EGPRS mobile device and a USF to the GPRS mobile device during the same time slot, it may be necessary to reduce the data rate to the EGPRS mobile device by 67% in order to transmit the USF in a format that the GPRS mobile device can understand.

Recently in a Global System for Mobile communication (GSM) Enhanced Data rates for GSM/EDGE Radio Access Network (GERAN) meeting, new modulation and coding schemes have been defined which increase the downlink throughput. These modulation and coding schemes (also called packet data block types) are implemented in EGPRS2-A technology and EGPRS2-B technology, which are also known as RED HOT A and RED HOT B, where RED HOT denotes Reduced Symbol Duration, Higher Order Modulation and Turbo Codes. These newer EGPRS2 packet data block types have the following properties:

| EGPRS2-A: | Legacy symbol rate (271 ksps) Turbo-codes 8PSK, 16QAM, 32QAM |
|---|---|
| EGPRS2-B: | 1.2X legacy GSM symbol rate (325 ksps) Turbo-codes QPSK, 16QAM, 32QAM | where 8PSK refers to 8 phase shift keying, 16QAM refers to 16 quadrature amplitude modulation, 32QAM refers to 32 quadrature amplitude modulation, and QPSK refers to quadrature phase shift keying.

Some exemplary aspects of the packet data block types are illustrated in the following two tables:

TABLE 1

Packet data block types for EGPRS-2-A

| | MCS | | | | | | | |
|---|---|---|---|---|---|---|---|---|
| | DAS-5 | DAS-6 | DAS-7 | DAS-8 | DAS-9 | DAS-10 | DAS-11 | DAS-12 |
| Modulation Family | | 8PSK | | | 16QAM | | 32QAM | |
| | B | Apad6 | Bpad2 | B | Apad6 | Bpad2 | Apad6 | Bpad2 |
| Bitrate [kbps/TS] | 22.4 | 27.2 | 32.8 | 44.8 | 54.4 | 65.6 | 81.6 | 98.4 |

TABLE 1-continued

Packet data block types for EGPRS-2-A

| | MCS | | | | | | | |
|---|---|---|---|---|---|---|---|---|
| | DAS-5 | DAS-6 | DAS-7 | DAS-8 | DAS-9 | DAS-10 | DAS-11 | DAS-12 |
| # RLC data blocks | 1 | | | 2 | | 2 | | 3 |
| Payload [octets] | 1 × 56 | 1 × 68 | 1 × 82 | 2 × 56 | 2 × 68 | 2 × 82 | 3 × 68 | 3 × 82 |

TABLE 2

Packet data block types for EGPRS2-B

| | MCS | | | | | | | |
|---|---|---|---|---|---|---|---|---|
| | DBS-5 | DBS-6 | DBS-7 | DBS-8 | DBS-9 | DBS-10 | DBS-11 | DBS-12 |
| Modulation | QPSK | | | 16QAM | | | 32QAM | |
| Family | B | A | B | A | B | A | Apad6 | A |
| Bitrate [kbps/TS] | 22.4 | 29.6 | 44.8 | 59.2 | 67.2 | 88.8 | 108.8 | 118.4 |
| # RLC data blocks | 1 | 1 | 2 | 2 | 3 | 3 | 4 | 4 |
| Payload [octets] | 1 × 56 | 1 × 74 | 2 × 56 | 2 × 74 | 3 × 56 | 3 × 74 | 4 × 68 | 4 × 74 |

The acronym DAS refers to a Downlink 2-A Scheme, and DBS refers to a Downlink 2-B Scheme. Other packet data block types may be used such as Coding Scheme (CS) 1-4, Modulation and Coding Schemes (MCS) 1-9, Uplink 2-A Schemes (UAS), and Uplink 2B Schemes (UBS). A Radio Link Control (RLC) block can belong to one of the A, Apad6, B, Bpad2, and C RLC block families.

With the definition of new mobile classes of terminals capable of supporting EGPRS2-A and EGPRS2-B technologies, these new mobile classes may be multiplexed both with the existing mobile classes and each other. In particular, the following USF multiplexing combinations may be used:
i) USF multiplexing of packet data blocks for EGPRS2-A mobile devices with USF information for EGPRS mobile devices,
ii) USF multiplexing of packet data blocks for EGPRS2-B mobile devices with USF information for EGPRS mobile devices, and
iii) USF multiplexing of packet data blocks for EGPRS2-B mobile devices with USF information for EGPRS2-A mobile devices.

EGPRS2-A and EGPRS2-B mobile devices may have the following capabilities:
  An EGPRS2-A mobile device may be able to decode the USF information in all GPRS, EGPRS, and EGPRS2-A blocks. More generally, the EGPRS2-A mobile device can support all GPRS, EGPRS, and EGPRS2-A packet data block types.
  An EGPRS2-B mobile device may be able to decode the USF information in all GPRS, EGPRS, EGPRS2-A, and EGPRS2-B blocks. More generally, the EGPRS2-B mobile device can support all GPRS, EGPRS, EGPRS2-A, and EGPRS2-B packet data block types.

The USF encoding used for packet data block types DAS-5, DAS-6, and DAS-7, which all use 8PSK modulation, is exactly the same as for EGPRS packet data block types MCS 5-9. Thus, as long as the EGPRS2-A mobile device uses DAS-5, DAS-6, or DAS-7, an EGPRS mobile device can demodulate and decode multiplexed USF information received during the same downlink time slot.

The EGPRS2-A and EGPRS2-B packet data block types have family relations where, within a family, all of the modulation and coding schemes can use the same turbo encoder. For each modulation and coding scheme, several puncturing patterns can be defined. If the mobile station supports incremental redundancy, a different puncturing pattern can be used for the initial transmission and each retransmission. Packet data block types in the same RLC block family use the same RLC block size. Any packet data block type within the same family can be used to re-transmit RLC blocks initially transmitted using another packet data block type in the same family.

EGPRS2-B was designed to be backwards compatible with EGPRS. If the USF was being transmitted to an EGPRS mobile device while data was being transmitted to the EGPRS2-B mobile device, packet data block types MCS 1-4 were to be used to transmit data to the EGPRS2-B mobile device. Because MCS 1-4 use GMSK modulation, the data rates of these services can be dramatically less than the data rates of packet data block types DBS-5 through DBS-12 that may be used when there is no need to simultaneously transmit USF to the EGPRS mobile. In particular, if the link to the EGPRS2-B mobile device will support DBS-12 (32QAM), the reduction in data rate when also transmitting USF information to an EGPRS mobile device can be more than 80%.

Similarly, EGPRS2-A was designed to be backwards compatible with EGPRS. If the USF was being transmitted to an EGPRS mobile device while data was being transmitted to the EGPR2-A mobile device, packet data block types MCS 1-4, or DAS-5 through DAS-7 were to be used to transmit packet data to the EGPRS2-A mobile device. Alternatively, if the USF was being transmitted to an EGPRS2-A mobile device multiplexed while packet data being transmitted to an EGPRS2-B mobile device, the system could only use packet data block types DAS-5 through DAS-12 or MCS 1-4 to transmit data to the EGPRS2-B mobile device. If DAS-5 through DAS-12 were used, these packet data block types had to be used continuously throughout the entire TBF, as it was not permitted to switch between DAS and DBS packet data block types within the TBF. Note that the current EGPRS2-B TBF definition allows only the modulation and coding schemes DBS 5-12, MCS 1-4, and MCS-0, while the current EGPRS2-A TBF definition allows only the modulation and coding schemes DAS 5-12 and MCS 1-4.

If switching between DAS and DBS packet data block types were allowed within the EGPRS2-B TBF, HARQ could not be used unless the allowed packet data blocks types were restricted. Also, if DAS-5 through DAS-12 were always used for the EGPRS2-B mobile device multiplexed on the same uplink time slot as an EGPRS2-A mobile device, the better link performance and higher peak rates of the DBS packet data block types could not be obtained for the EGPRS2-B mobile device. The advantage of this method is that EGPRS2-A and EGPRS2-B mobile devices can now be USF multiplexed without any need to use MCS-2 and MCS-3 to transmit data to the EGPRS2-B mobile device and USF information to the EGPRS2-A mobile device during the same downlink time slot. The disadvantage of this method is that the EGPRS2-B mobile device cannot get the increased throughput achievable with packet data block types DBS-5 through DBS-12 when multiplexed with an EGPRS2-A mobile device because throughput of EGPRS2-A technology can be as much as 20% less than EGPRS2-B technology throughput.

Among other benefits, the present disclosure can overcome the deficiencies of prior methods and devices. For example, the present disclosure can improve the efficiency of USF multiplexing of EGPRS2-A and EGPRS2-B mobile devices in the same time slot. The present disclosure can also improve the efficiency of USF multiplexing of EGPRS2-B and EGPRS mobile devices in the same time slot. One reason is that currently, the standard does not allow the network to switch between GPRS, EGPRS, EGPRS2-A, and EGPRS2-B packet data block types within the TBF when transmitting to a mobile device. Currently, the set of packet data block types that can be used to transmit to a particular mobile device is a function of the TBF type (e.g, EGPRS2-B, EGPRS2-A, EGPRS, GPRS) and thus can only be changed at TBF boundaries.

Recently, there has been discussion of the possibility of switching between EGPRS2-A and EGPRS2-B packet data block types within the TBF when transmitting to the EGPRS2-B mobile device. Initially, it was believed that this could resolve the current difficulty in transmitting USF information to the EGPRS2-A mobile device while transmitting packet data blocks to the EGPRS2-B mobile device, because this could be accomplished by using the EGPRS2-A packet data block types DAS-5 through DAS-12 to transmit packet data blocks to the EGPRS2-B mobile device. Because the link performance and throughput of DAS-5 through DAS-12 is only slightly inferior to that of DBS-5 through DBS-12, the average throughput reduction to the EGPRS2-B mobile device associated with using this method (only when necessary to transmit USF to the EGPRS2-A mobile device while transmitting packet data blocks to the EGPRS2-B mobile device) would be quite small.

Because different families are defined for EGPRS2-A and EGPRS2-B technologies, if an EGPRS2-B A family packet data block type were used for the first transmission of an RLC block, it would not be possible to re-transmit the RLC block using any EGPRS2-A packet data block type, because the A family of RLC blocks does not exist within the EGPRS2-A technology. The only way to re-transmit an A block using EGPRS2-A technology would be to pad the A block (74 bytes) into a B pad 2 block (8 more bytes), re-encode the padded RLC block, and re-transmit using an EGPRS2-A packet data block type belonging to the B pad 2 family of RLC blocks. As there is currently no need for such padding, no padding method has been specified. However, if this method is used, it may not be possible to combine transmissions and re-transmissions using either Chase combining or incremental redundancy.

Similarly, if an EGPRS2-A D family packet data block type were used for the first transmission of an RLC block, it may not be possible to re-transmit the RLC block using any EGPRS2-B packet data block type because the B pad 2 family of RLC blocks does not exist within the EGPRS2-B technology. Furthermore, because a B pad 2 RLC block is larger than any EGPRS2-B RLC block, the B pad 2 RLC block may not be padded into a larger RLC block size and thus the B pad 2 block cannot be re-transmitted using EGPRS2-B technology. Furthermore, the B pad 2 RLC block may not be split for retransmission without the definition of additional signaling. Thus, there are some clear difficulties in switching between EGPRS2-A and EGPRS2-B packet data block types within the TBF as a means of resolving the USF signaling problem when EGPRS2-A and EGPRS2-B mobile devices are USF multiplexed on the same time slot. The present disclosure can solve these and other problems by switching between EGPRS2-A and EGPRS2-B packet data block types within the TBF when transmitting to the EGPRS2-B mobile device.

Figure 2:
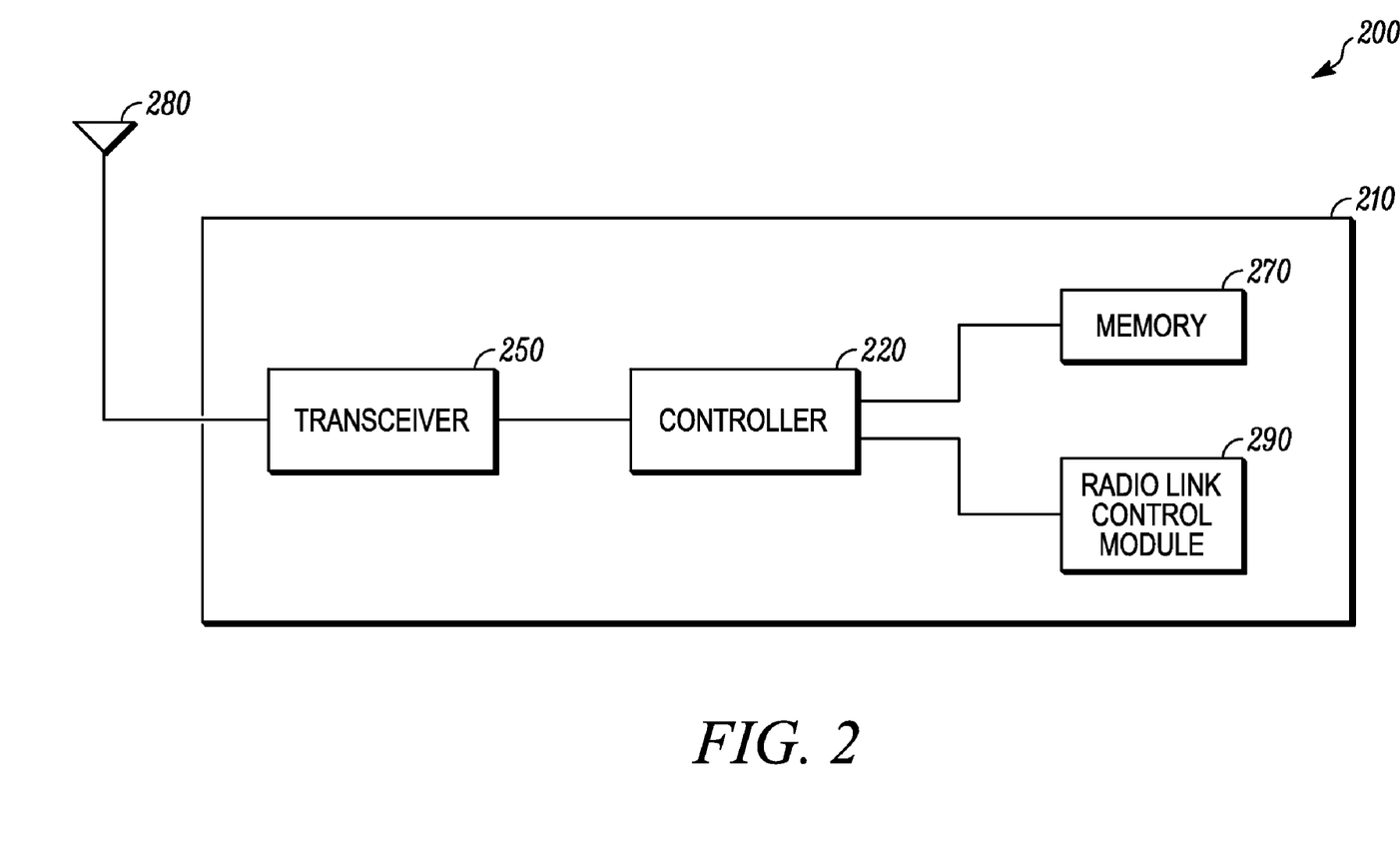
FIG. 2 illustrates an example block diagram of an apparatus in accordance with one embodiment.

FIG. 2 is an exemplary block diagram of an apparatus 200 that can be located at the base station 130, at the network controller 140, or anywhere else in the system 100, according to one embodiment. The apparatus 200 can include a housing 210, a controller 220 located within the housing 210, a transceiver 250 coupled to the controller 220, a memory 270 coupled to the controller 220, and an antenna 280 coupled to the transceiver 250. The apparatus 200 can also include a module 290, such as a packet data block determination module, in one embodiment. The packet data block determination module 290 can be coupled to the controller 220, can reside within the controller 220, can reside within the memory 270, can be an autonomous module, can be software, can be hardware, or can be in any other format useful for a module for an apparatus 200. The transceiver 250 may include a network interface, a transmitter, a receiver, and/or any other device capable of sending and receiving signals. The memory 270 may include a random access memory, a read only memory, an optical memory, or any other memory that can be coupled to a controller.

The transceiver 250 can multiplex signals for the enhanced general packet radio service non-2-B mobile device with signals for the enhanced general packet radio service 2-B mobile device in a single time slot. The transceiver can switch between an EGPRS non-2-B enhanced general packet radio service packet data block type and a 2-B enhanced general packet radio service packet data block type within a radio link control block family while sending packet data to the enhanced general packet radio service 2-B mobile device during a temporary block flow.

In a preferred embodiment as shown in FIG. 2, an apparatus 200, such as a communication device or mobile is shown. It includes: a controller 220 configured to control operations of the apparatus; a transceiver 250 coupled to the controller 220, the transceiver 250 configured to send and receive signals; and a module 290, which can be referred to as a radio link control module, coupled to the controller 220, the radio link control module 290 is configured to: demodulate a padded radio link control block; generate metrics for each systematic and parity bit contained in the padded radio link control block; discard the systematic and parity bit metrics corresponding to encoded padding; and (i) in the event of a first transmission, turbo decode; and (ii) in the event of a re-transmission, combine parity metrics with those of previous transmissions using Chase and incremental redundancy combining and then turbo decode. Advantageously, this embodiment is particularly adapted to utilize Hybrid-ARQ, which in turn is enabled by Chase and incremental redundancy combining, to significantly increase the throughput achievable on the radio link. Also in a preferred embodiment, the radio link control module is also configured to demap, depuncture and deinterleave the parity bit metrics which are the output of the demodulator Referring to FIG. 3, a method 300 for radio link control padding is shown. In its simplest form, it can include the steps of: providing 310 N bytes of data from a base station; interleaving 320 the N bytes of data using a turbo-interleaver; pre-pending 330 K bytes of zero padding; and 340 passing the interleaved N bytes and the pre-pended K bytes to a convolutional encoder to provide an output comprising a parity sequence adapted for further processing and providing a radio link control block for an enhanced general packet radio service 2-B mobile device. The method 300 is particularly adapted for use with Chase and incremental redundancy combining, which can provide fast, reliable and efficient general packet radio service to a 2-B mobile device as well as non 2-B devices, which is do to the turbo-interleaver only operating on the data and not the padding. The parity sequence produced by the second convolutional encoder of the padded modulation and coding modulation and coding scheme is the same as that produced by the unpadded modulation and coding scheme, with the caveat that a sequence of zeros is appended to the start of the second parity sequence produced by the padded modulation and coding scheme. After the parity metrics corresponding to the zero padding of the padded modulation and coding scheme are discarded, the turbo decoder for the padded and unpadded modulation schemes are substantially the same.

Figure 3:
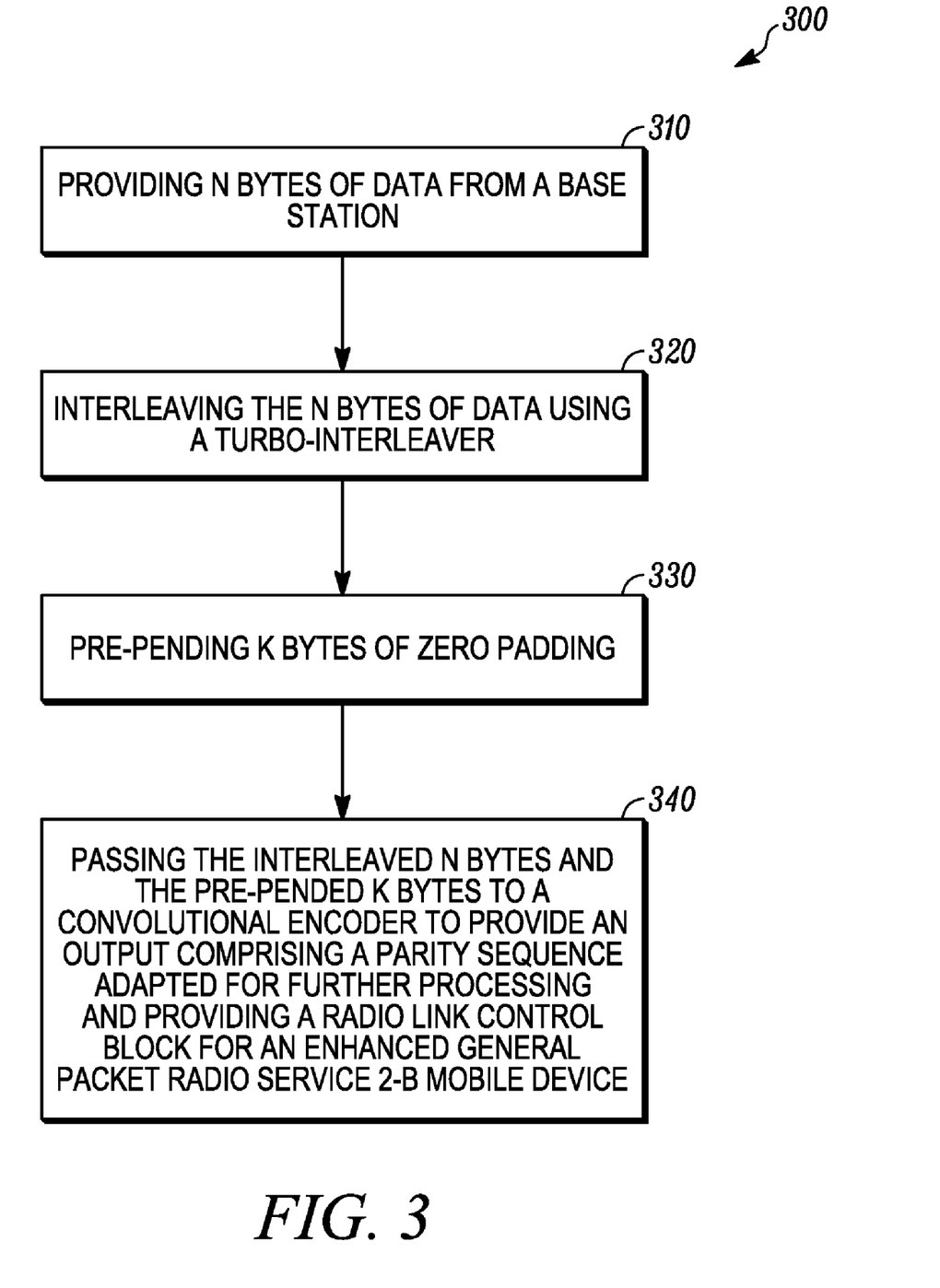
FIG. 3 shows a sample flowchart illustrating the operation of the apparatus of FIG. 1 in accordance with one possible embodiment.

The radio link control block can include a data portion and a padding portion, whereby the data portion of a retransmission of a radio link control block using a padded modulation and coding scheme can be matched in size with a previous transmission of the radio link control block using an unpadded modulation and coding scheme. Advantageously, this can be accomplished by providing the same size data sequence for transmissions and retransmissions. The padding is added to the data so that the combination of padding and data matches the block size of an existing modulation and coding scheme, and this has the advantage that it avoids the need to define one or more additional modulation and coding schemes, each of which requires the definition of an interleaver, multiple puncturing patterns, and a mapping of the punctured code onto the four bursts comprising each radio block.

In one arrangement, the radio link control block is provided with: an EGPRS2-A radio link control block family A pad 6 including packet data block types DAS-6, DAS-9 and DAS-11; and an EGPRS2-B radio link control block family A pad 6 including packet data block types DBS-6 pad, DBS-8 pad, and DBS-10 pad, being adapted for use with Chase and incremental redundancy combining. In one embodiment, the data portion of the DBS-6 pad, DBS-8 pad, and DBS-10 pad radio blocks is 68 bytes (A pad 6 RLC block) and the padded portion is 6 bytes so that the combination of the data and padding matches the RLC block sized for DBS-6, DBS-8, and DBS-10, which is 74 bytes. If the turbo-interleaver for DBS-6 pad, DBS-8 pad, and DBS-10 pad operates only on the 68 bytes of data, Chase and incremental redundancy combining can be used to combine the DAS-6, DAS-9 or DAS-11 transmission and the DBS-6 pad, DBS-8 pad, or DBS-10 pad retransmission (transmission). Advantageously, the existing DAS-6, DAS-9, and DAS-11 68 byte turbo decoder can be used to decode the DBS-6 pad, DBS-8 pad, and DBS-10 pad transmissions.

In another arrangement, the radio link control block is provided with: an EGPRS2-A radio link control block family A including packet data block types DAS-7 pad, DAS-10 pad and DAS-12 pad; a EGPRS2-B radio link control block family including packet data block types DBS-6, DBS-8, DBS-10 and DBS-12, being adapted for use with Chase and incremental redundancy combining. Likewise, the data portion of the DAS-7 pad, DAS-10 pad, and DAS-12 pad radio blocks is 74 bytes (A RLC block) and the padded portion is 8 bytes so that the combination of the data and padding matches the RLC block sized for DAS-7, DAS-10, and DAS-12, which is 82 bytes. If the turbo-interleaver for DAS-7 pad, DAS-10 pad, and DAS-12 pad operates only on the 74 bytes of data, Chase and incremental redundancy combining can be used to combine the DBS-6, DBS-8, DBS-10 or DBS-12 transmission and the DAS-7 pad, DAS-10 pad, or DAS-12 pad retransmission (transmission). Advantageously, the existing DBS-6, DBS-8, and DBS-10 74 byte turbo decoder can be used to decode the DAS-7 pad, DAS-10 pad, and DAS-12 pad transmissions.

Both of the above two arrangements can provide fast and reliable transmissions and retransmissions for 2-B mobile devices and can provide improved compatability and interoperability with non 2-B mobiles. Advantageously, both arrangements are fully compatible with Hybrid-ARQ, which is enabled by Chase and incremental redundancy combining, and which significantly increases the throughput achievable on the radio link.

In a preferred arrangement, a first transmission of a radio link control block, such as one in the preceding three paragraphs, is combined with subsequent retransmissions of the radio link control block using at least one of Chase and incremental redundancy combining. This is facilitated by operating the turbo interleaver on only the data bytes of the padded modulation and coding schemes, pre-pending the zero padding to the turbo-interleaved data, and providing the result as input to the second systematic convolutional encoder, the output of which is the second parity sequence for the turbo-encoded data.

In one embodiment, a highest data rate available is selected which is consistent with a desired link quality and compatible with the standard. If, when transmitting data to the EGPRS2-B mobile, there is a need to signal USF or PAN to a non EGPRS2-B mobile relatively infrequently, then the link should adapt to the EGPRS2-B modulation and coding scheme which yields the largest throughput to the EGPRS2-B mobile for the given link quality in the absence of the need to send signaling to the non EGPRS2-B mobiles. Conversely, if when transmitting data to the EGPRS2-B mobile, USF and or PAN signaling must be sent to the EGPRS2-A mobile very frequently, and thus for the majority of radio blocks, the link should adapt to the EGPRS2-A modulation and coding scheme which yields the largest throughput to the EGPRS2-B mobile for the given link quality. When sending data to an EGPRS2-B mobile and signaling to an EGPRS2-A mobile, pairs of modulation and coding schemes should be considered during link adaptation, with the first element of the pair being an EGPRS2-B modulation and coding scheme and the second element of the pair being an EGPRS2-A modulation and coding scheme with the same RLC block size and which uses the same modulation constellation. Link adaptation can then be performed on these pairs of modulation and coding schemes. The pair of EGPRS2-B and EGPRS2-A modulation and coding schemes is selected which yields the best average data throughput to the EGPRS2-B mobile for a given link quality and also given that signaling must be sent to the EGPRS2-A mobile with probability p. In general, the optimal pair will depend both on the link signal-to-noise plus interference ratio and the fraction of the time p for which at least one of the USF or PAN must be signaled to an EGPRS2-A mobile. This approach can provide enhanced speed, reliability and accuracy for the communication of radio link control blocks.

In one embodiment, the passing step 340 provides an output comprising a parity sequence adapted for further processing for improved speed and reliability of general packet radio service to 2-B mobile devices and compatible non 2-B devices. The parity sequence is further processed, including interleaving, puncturing and mapping to a radio link control block for an enhanced general packet radio service 2-B mobile device and which is adapted for use with Chase and incremental redundancy combining between unpadded (padded) EGPRS2-B modulation and coding schemes and padded (unpadded) EGPRS2-A modulation and coding schemes.

Figure 9:
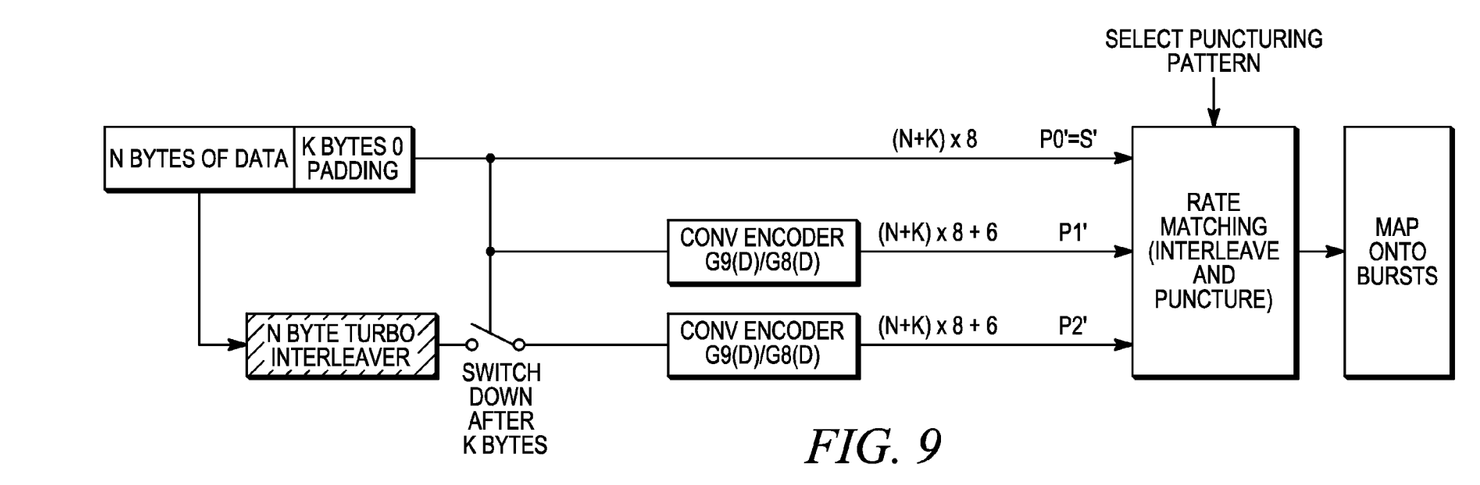
FIG. 9 shows a proposed implementation for block encoding for DBS-6 pad, DBS-8 pad and DBS-10 pad (N=68, K=6), in accordance with an embodiment.

In a preferred embodiment, the passing step 340 further includes the convolutional encoder providing three outputs, as best shown in FIG. 9, comprising: a first parity sequence of K bytes of zero padding followed by the uncoded N-byte data sequence; a second parity sequence that is the response of a recursive convolutional encoder to an input sequence consisting of K bytes of zero padding pre-pended to the uncoded N-byte data sequence; and a third parity sequence that is the response of a recursive convolutional encoder to an input sequence consisting of K bytes of zero padding pre-pended to the turbo-interleaved uncoded N-byte data sequence. These three parity sequences define the mother code for the padded modulation and coding scheme. The mother code is then interleaved, punctured and mapped to the radio block. The three parity sequences defined for the padded modulation and coding scheme with N bytes of data and K bytes of padding are precisely the same as those for the unpadded modulation and coding scheme with K bytes of data, with the exception that the parity sequences of the mother coded for the padded modulation and coding scheme each have K bytes of zeros pre-pended. As a result, the decoder for the padded modulation and coding scheme can simply discard all metrics for parity bits corresponding to these K bytes of pre-pended zeros and use the same turbo decoder as for the corresponding unpadded N-byte modulation and coding scheme. Furthermore, by implementing padding in this manner for the padded modulation and coding scheme, Chase and incremental redundancy combining can be used between padded (unpadded) transmissions and unpadded (padded) retransmissions, and this enables hybrid-ARQ.

The proposed padding method for the padded modulation and coding schemes that is compatible with Chase and incremental redundancy combining is shown in FIG. 9. Note that K bytes of zero padding are pre-pended to the N bytes of data to produce a K+N byte zero-padded input sequence. As the 3GPP turbo code is a systematic code, the first sequence of parity bits P0' is simply the padded K+N byte data sequence. The second parity sequence P1" is the response of a recursive convolutional encoder to this K+N byte padded input sequence. The input to a second recursive convolutional encoder (which for 3GPP is the same as the first recursive convolutional coder) is the K bytes of zero-padding followed by the turbo-interleaved N-byte data sequence. Initially, the switch in FIG. 9 is in the "up" position, and the K-bytes of zero-padding are clocked into the recursive convolutional encoder. The switch then moves to the horizontal position, or "down", and the N-bytes of turbo-interleaved data are clocked into the recursive convolutional encoder. The output of the second recursive convolutional encoder is the third parity sequence P2".

In one embodiment, a signal is provided in the radio block header to provide notification to a mobile that a payload is a padded radio link control block. The header is encoded separately, interleaved and is mapped onto and transmitted with the four bursts of the radio block.

Figure 4:
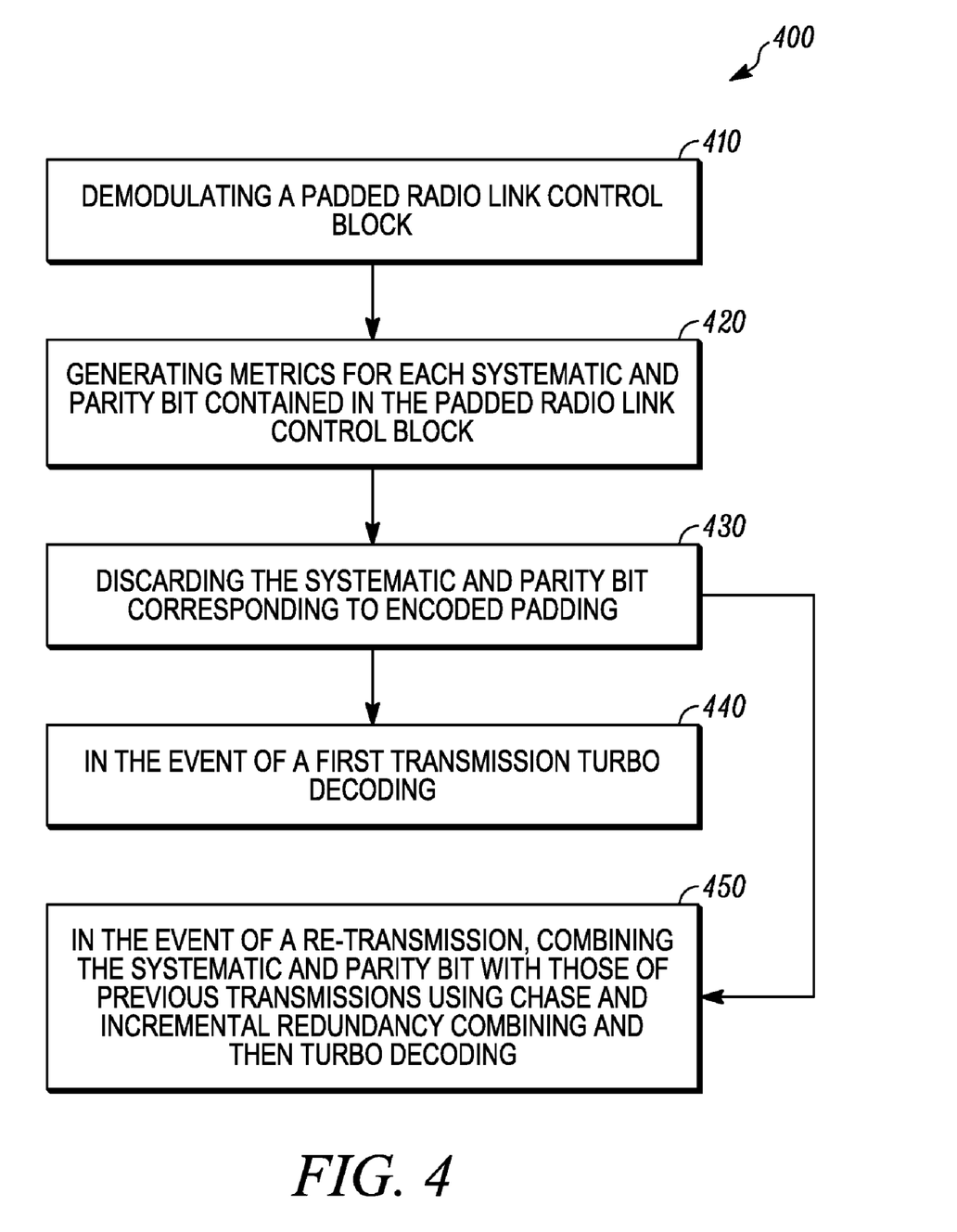
FIG. 4 shows a sample flowchart illustrating the operation of the apparatus of FIG. 2 in accordance with another possible embodiment.

In FIG. 4, a method 400 for a communication device or mobile is shown. In can include the steps of: demodulating 410 a padded radio link control block; generating 420 metrics for each systematic and parity bit contained in the padded radio link control block; discarding 430 the systematic and parity bit corresponding to encoded padding; and in the event of a first transmission turbo decoding 440 and in the event of a re-transmission, combining 450 the systematic and parity bit with those of previous transmissions using Chase and incremental redundancy combining and then turbo decoding. Advantageously, the method provides fast and reliable general packet radio service in a 2-B mobile device or non 2B mobile. In a preferred embodiment, the generating step 420 includes demapping, depuncturing and deinterleaving the parity bit metrics which are the output of a demodulator.

The Uplink State Flag (USF) can be used on packet data channels to allow multiplexing of uplink radio blocks from different mobile stations. The USF can include 3 bits encoded within a radio block that is sent on a downlink. It can enable the coding of eight different USF states which can be used to multiplex the uplink traffic. Thirteen GPRS and EGPRS coding schemes may be specified for packet data traffic channels. For example, for packet data block types CS-2 to CS-4 and MCS-1 to MCS-4, the three bits USF-bits are encoded into twelve coded in a manner that is independent of the specific coding scheme. For these packet data block types, the USF-bits can therefore be decoded from these twelve bits in the same way. For the nine coding schemes MCS-1 to MCS-9, the block structure can differ between uplink and downlink since header sizes before coding are not the same.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

In more detail and in a preferred embodiment, this disclosure is particularly adapted to providing EGPRS2 RLC block padding which is compatible with turbo codes and Chase and incremental redundancy combining.

In EGPRS and EGPRS2, the payload of each modulation and coding scheme they use a particular radio link control (RLC) block size. Some of the various RLC block sizes and the modulation and coding schemes using these RLC block sizes are provided in Table 3 below. Whenever an RLC block is not received correctly by a mobile, the mobile sends a NACK to the base station to request retransmission of the RLC block, after which the network retransmits the RLC block to the mobile. This process is repeated until the RLC block is received correctly and acknowledged by the mobile.

TABLE 3

EGPRS/EGPRS2 Modulation and Coding Schemes with RLC Block Sizes
(** indicates proposed modulation and coding scheme not in standard)

| Modulation and Coding Scheme | Family | Block Size (bytes) | Modulation and Coding Scheme | Family | Block Size | Modulation and Coding Scheme | Family | Block Size |
|---|---|---|---|---|---|---|---|---|
| MCS-1 | C | 22 | DAS-5 | B | 56 | DBS-5 | B | 56 |
| MCS-2 | B | 28 | DAS-6 | A pad 6 | 68 | DBS-6 | A | 74 |
| MCS-3 | A | 37 | DAS-7 | B pad 2 | 82 | DBS-6 pad | A | 6 + 68 |
| MCS-3 pad 6 | A | 6 + 31 | DAS-7 pad** | B pad 2 | 8 + 74 | DBS-7 | B | 56 |
| MCS-4 | C | 44 | DAS-8 | B | 56 | DBS-8 | A | 74 |
| MCS-5 | B | 56 | DAS-9 | A pad 6 | 68 | DBS-8 pad | A | 6 + 68 |
| MCS-6 | A | 74 | DAS-10 | B pad 2 | 82 | DBS-9 | B | 56 |
| MCS-6 pad 6 | A | 6 + 68 | DAS-10 pad** | B pad 2 | 8 + 74 | DBS-10 | A | 74 |
| MCS-7 | B | 56 | DAS-11 | A pad 6 | 68 | DBS-10 pad | A | 6 + 68 |
| MCS-8 | A pad 6 | 68 | DAS-12 | B pad 2 | 82 | DBS-11 | A pad 6 | 68 |
| MCS-9 | A | 74 | DAS-12 pad** | B pad 2 | 8 + 74 | DBS-12 | A | 74 |

Typically, the same modulation and coding scheme would be used to retransmit the RLC block as was used initially to transmit the block. However, there are instances when it is not possible to use the same modulation and coding scheme for the retransmission as was used for the initial transmission. One such instance occurs after link adaptation. If the link quality degrades such that it will no longer support a given data rate, or equivalently, a given modulation and coding scheme, then a new modulation and coding scheme must be chosen for the retransmission. For example, this can occur in a poor coverage area or urban canyon. Another instance in which the same modulation and coding scheme cannot be used for the retransmission as was used for the initial transmission occurs when the base station is simultaneously sending data to a mobile of one type and sending uplink state flags (USF) or piggy-back ACK/NACK (PAN) to a mobile of another type. An example of this second instance would occur when sending data to an EGPRS2-B mobile and USF or PAN to an EGPRS or EGPRS2-A mobile.

When retransmitting a particular RLC block, only certain modulation and coding schemes can be used. In particular, the modulation and coding scheme used for the retransmission must have the same RLC block size as the modulation and coding scheme used for the initial transmission. However, for MCS-8 and DBS-11, there are no modulation and coding schemes that use the same block size. For this reason, several padded modulation and coding schemes have been defined which can be used to retransmit RLC blocks that have been initially transmitted using these two modulation and coding schemes. Specifically, MCS-3 pad and MCS-6 pad can be used to retransmit MCS-8 RLC blocks, while DBS-6 pad, DBS-8 pad, and DBS-10 pad can be used to retransmit DBS-11 RLC blocks. Note that these padded modulation and coding schemes are in addition to MCS-3, MCS-6, DBS-6, DBS-8, and DBS-10. The RLC block lengths for MCS-3 and MCS-6 are 37 and 74 bytes (A family), respectively, whereas the RLC block length for MCS-8 is 68 bytes (A pad 6). Thus, the MCS-8 RLC block retransmission can be sent using MCS-6 if 6 bytes of zero-padding are added to the start of the MCS-8 RLC block. Similarly, the MCS-8 RLC block can be retransmitted using two MCS-3 RLC blocks by transmitting 37 bytes of data in the first MCS-3 RLC block and transmitting 31 bytes of data and 6 bytes of zero padding in the second MCS-3 RLC block. When MCS-3 pad or MCS-6 pad are used to retransmit Ap RLC blocks, this must be signaled in a header so that the mobile is aware that the payload is a padded Ap RLC block and not an A RLC block. The zero padding is implemented in the standard as indicated in the following text from Section 9.3.2.1 of TS 44.060:

"For blocks initially transmitted with MCS-8 which are retransmitted using MCS-6 or MCS-3, padding with all zeroes of the first six octets shall be applied as described in Annex J and the CPS field shall be set to indicate that this has been done."

"In case an RLC data block originally transmitted using MCS-8 is retransmitted using two MCS-3 RLC/MAC blocks, the CPS field of the first MCS-3 RLC/MAC block shall indicate MCS-3 with padding while the CPS field of the second MCS-3 RLC/MAC block shall indicate either MCS-3 with padding or MCS-3 without padding."

As is known in the art, it should be noted that the use of zero padding is somewhat inefficient in that the zero-padded bytes are encoded and transmitted, and yet these bytes contain no data. However, the padded modulation and coding schemes are used in order to avoid the need to define two and three additional modulation and coding schemes, respectively, solely for the purpose of retransmitting MCS-8 RLC blocks and DBS-11 RLC blocks after link adaptation, as each additional modulation and coding scheme requires the definition of an interleaver, burst mappings, and multiple puncturing patterns. Thus, the padded modulation and coding schemes MCS-3 pad, MCS-6 pad, DBS-6 pad, DBS-8 pad, and DBS-10 pad are used in order to reduce complexity. With the padded modulation and coding schemes, the mobile receiver can demodulate and decode the transmissions exactly as if these transmissions were unpadded, after which the decoder output corresponding to the zero-padded bytes can simply be discarded.

Figure 5:
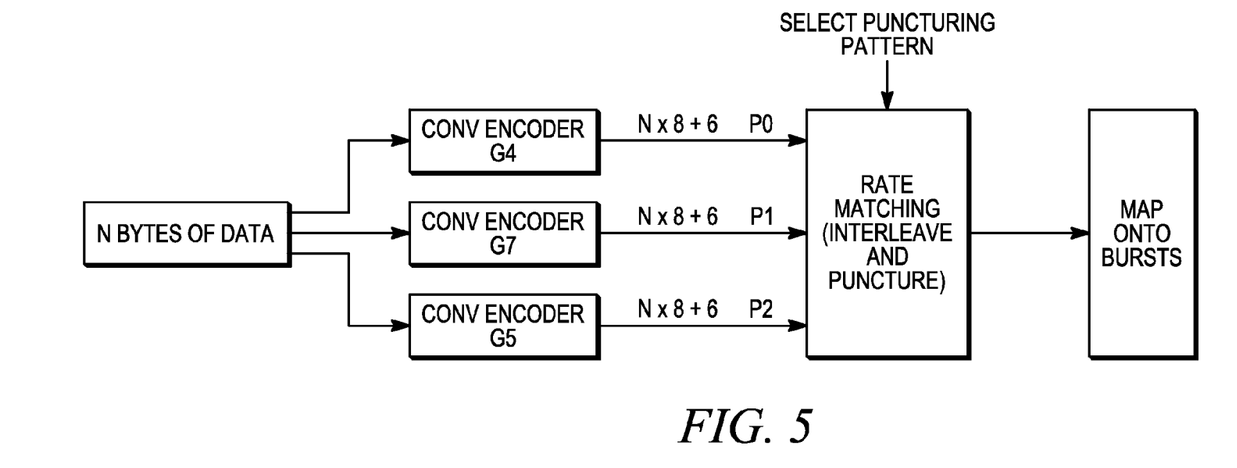
FIG. 5 shows a sample flowchart outlining the operation of the apparatus of FIG. 2 in accordance with a third possible embodiment.
Figure 6:
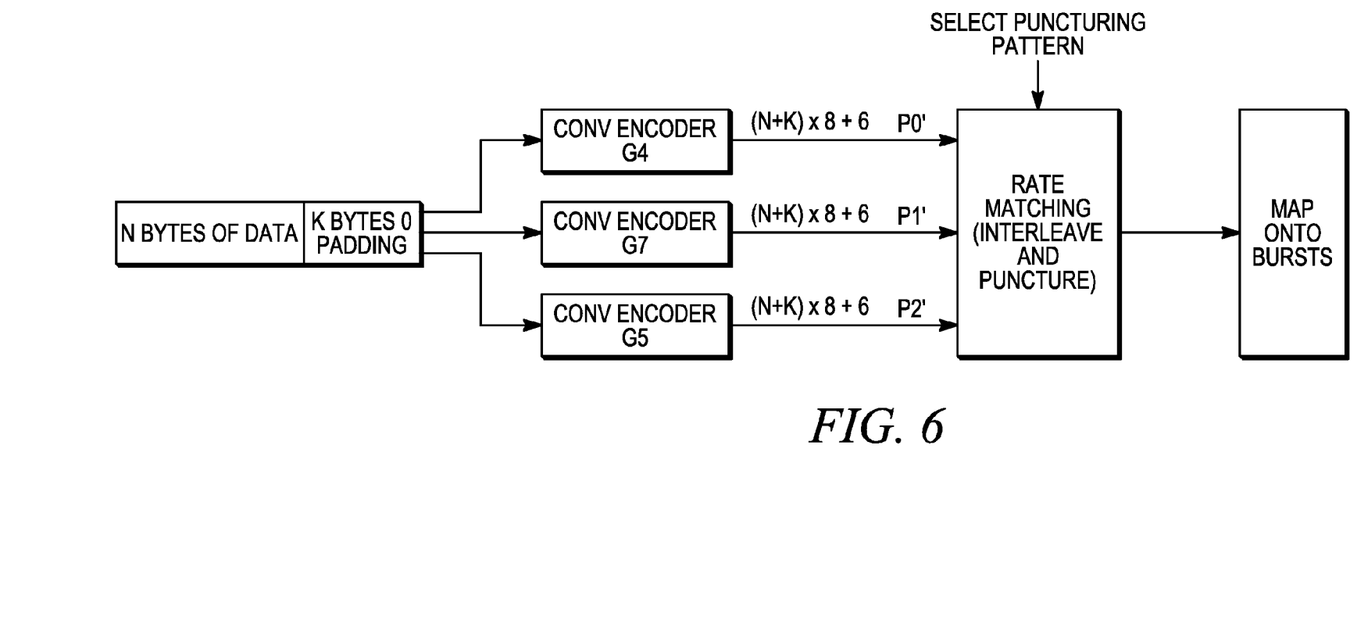
FIG. 6 shows an implementation of convolutional encoding for MCS-6 pad.

FIG. 5 indicates the implementation of convolutional encoding for MCS-8. The rate 1/3 convolutional encoder outputs three parity sequences which we denote P0, P1, and P2. Note that each of these parity sequences has length 550 (=68×8+6) where the last 6 bits correspond to 6 zeros added to the end of the data to force the convolutional encoder to the zero state. FIG. 6 indicates the implementation of convolutional encoding for MCS-6 pad. Note that the 6 bytes of zero padding enter the convolutional encoder first. Let P0', P1' and P2' denote the three parity sequences output by the rate 1/3 convolutional encoder, each of which has length 598 (=74×8+6), where again, the last 6 bits are zeros appended to the end of the data to force the convolutional encoder to the zero state. In comparing the sequences P0, P1, and P2 with the sequences P0', P1' and P2', it can be seen that the two sets of sequences are identical except that the sequences P0', P1' and P2' each have 48 zeros appended to the start. Equivalently, this can be represented as:

$$P0' = (0, \ldots, 0, P0)$$

$$P1' = (0, \ldots, 0, P1)$$

$$P2' = (0, \ldots, 0, P2)$$

where in each case the leading sequence of 0 parity bits has length 48.

As a consequence, it is clear that Chase and incremental redundancy combining can be used to combine the first transmission of the MCS-8 RLC block with subsequent retransmissions of the RLC block using MCS-6 pad. Upon receiving the initial MCS-8 transmission of the RLC block, the mobile receiver generates a soft reliability metric for each of the P0, P1, and P2 parity bits received in this first transmission. Note that not all of the bits of the parity sequences are sent on a given transmission. Only a subset of the parity sequences is sent on each transmission—the rest are punctured. The particular subset depends on the puncturing pattern that is used. Similarly, if MCS-6 pad is used for the retransmission of the MCS-8 RLC block, then the mobile receiver generates a soft reliability metric for each of the P0', P1', and P2' parity bits received on this retransmission. The receiver then discards any metric corresponding to the first 48 parity bits of the sequences P0', P1', and P2'. Each of the remaining metrics then corresponds to a parity bit in one of the sequences P0, P1, and P2. If a soft metric is available in both the first MCS-8 transmission and in the second MCS-6 retransmission for a particular parity bit of P0, P1, and P2, the first metric and the second metric are combined to form a new soft metric in accordance with a measure of their reliabilities. This is sometimes referred to as Chase combining. After this combining process, the mobile receiver uses the soft metrics corresponding to the subset of the parity sequences P0, P1, and P2 received in the MCS-8 transmission and the MCS-6 retransmission to decode the data.

As is known by those skilled in the art, new modulation and coding schemes have been defined for EGPRS2, some of which are padded modulation and coding schemes to be used for retransmissions. EGPRS2 consists of EGPRS2-A and EGPRS2-B. EGPRS2-A operates at the legacy symbol rate of 271 ksps and uses turbo codes. EGPRS2-B operates at 325 ksps and also uses turbo codes. Eight new modulation and coding schemes are defined for EGPRS2-A and these are referred to as DAS 5-12. Some aspects of the EGPRS2-A modulation and coding schemes are described in Table 4, below. Note that DAS 5-7 use 8PSK modulation, DAS 8-9 use 16 QAM, and DAS 10-12 use 32-QAM.

TABLE 4

Modulation and coding schemes for EGPRS2-A

| | MCS | | | | | | | |
|---|---|---|---|---|---|---|---|---|
| | DAS-5 | DAS-6 | DAS-7 | DAS-8 | DAS-9 | DAS-10 | DAS-11 | DAS-12 |
| Modulation | | 8PSK | | | 16QAM | | 32QAM | |
| Family | B | Apad6 | Bpad2 | B | Apad6 | Bpad2 | Ap | Bpad2 |
| Bitrate [kbps/TS] | 22.4 | 27.2 | 32.8 | 44.8 | 54.4 | 65.6 | 81.6 | 98.4 |
| # RLC data blocks | | 1 | | 2 | | 2 | 3 | |
| Payload [octets] | 1 × 56 | 1 × 68 | 1 × 82 | 2 × 56 | 2 × 68 | 2 × 82 | 3 × 68 | 3 × 82 |

Additional selected aspects of the EGPRS2-B modulation and coding schemes are shown in Table 5. Note that DBS 5-6 use QPSK, DBS 7-9 use 16 QAM, and DBS 10-12 use 32 QAM. In addition to the modulation and coding schemes identified in Table 3, there are three additional modulation and coding schemes that are referred to as DBS-6 pad, DBS-8 pad, and DBS-10 pad. These modulation and coding schemes are intended for the retransmission of RLC blocks initially transmitted using DBS-11. As the A RLC block used for DBS-6, 8 and 10 is 74 bytes while the A pad 6 RLC block used for DBS-11 is 68 bytes, the DBS-11 A pad 6 RLC blocks can be retransmitted using the DBS-6, 8, or 10 A RLC blocks, provided 6 bytes of padding are added to the A pad 6 RLC block. When DBS-6 pad, DBS-8 pad or DBS-10 pad are used to retransmit A pad 6 RLC blocks, this must be signaled in the header so that the mobile is aware that the payload is a padded A pad 6 RLC block and not an A RLC block.

TABLE 5

Modulation and coding schemes for EGPRS2-B

| | MCS | | | | | | | |
|---|---|---|---|---|---|---|---|---|
| | DBS-5 | DBS-6 | DBS-7 | DBS-8 | DBS-9 | DBS-10 | DBS-11 | DBS-12 |
| Modulation | QPSK | | | 16QAM | | | 32QAM | |
| Family | B | A | B | A | B | A | Apad6 | A |
| Bitrate [kbps/TS] | 22.4 | 29.6 | 44.8 | 59.2 | 67.2 | 88.8 | 108.8 | 118.4 |
| # RLC data blocks | 1 | 1 | 2 | 2 | 3 | 3 | 4 | 4 |
| Payload [octets] | 1 × 56 | 1 × 74 | 2 × 56 | 2 × 74 | 3 × 56 | 3 × 74 | 4 × 68 | 4 × 74 |

Figure 7:
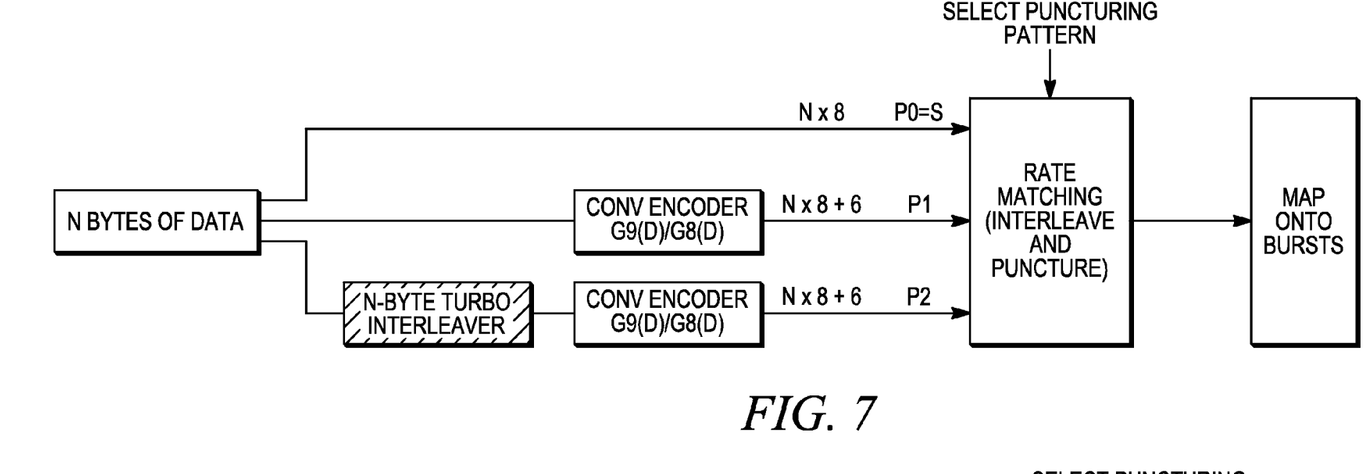
FIG. 7 shows an implementation for block encoding for DBS-6, DBS-7 and DBS-10 RLC (N=74)
Figure 8:
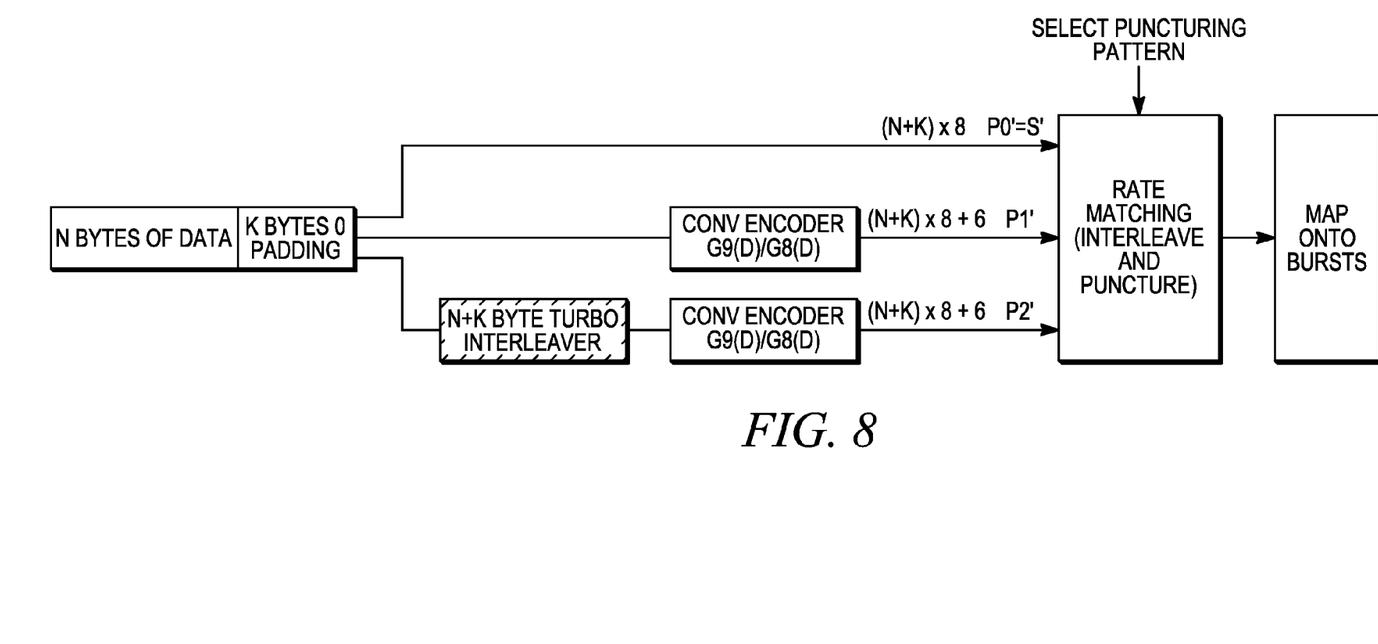
FIG. 8 shows a potential implementation for block encoding for DBS-6 pad, DBS-8 pad and DBS-10 pad (N=68, K=6), in accordance with an embodiment.

The padding schemes to be used for DBS-6 pad, DBS-8 pad, and DBS-10 pad have not yet been defined in the standard. Speculating, it can be assumed that the intention is to directly extend the method used for MCS-6 pad and MCS-3 pad. For all of the DAS and DBS modulation and coding schemes, a rate 1/3 turbo code is used as the mother code. The encoding method used for DBS-11 is illustrated in FIG. 7. For these modulation and coding schemes, 68 bytes (544 bits) of data are input to the turbo encoder. As the turbo code is a systematic code, the first sequence of parity bits is the 68 bytes of uncoded data S, and thus P0=S. The second parity sequence P1 is the response of a recursive convolutional encoder to the uncoded data S, while the third parity sequence P2 is the response of the same recursive convolutional encoder to the interleaved sequence S. Note that the turbo interleaver for DBS-11 operates on 68 bytes of data. According to the instant disclosure, in the event that the same padding method as that used previously for MCS-6 pad were to be used for DBS-6 pad, DBS-8 pad, and DBS-10 pad, for retransmission of the 68-byte DBS-11 RLC block, then 6 bytes of zero padding would be pre-pended to the 68 bytes of data, as is shown in FIG. 8. The resulting parity sequences would then be given by P0', P1', and P2', where $$P0'=(0,\ldots,0,S)$$

$$P1'=(0,\ldots,0,P1)$$

where in each case the leading sequence of 0 parity bits has length 48. However, because the turbo interleaver for DBS-6 pad, DBS-8 pad, and DBS-10 pad presumably operates on all 74 bytes, we have that $$P2' \neq (0,\ldots,0,P2).$$

As a consequence, neither Chase nor incremental redundancy combining can be used to combine the P2 parity bits from the initial transmission using DBS-11 and the P2, bits from the retransmission using DBS-6 pad, DBS-8 pad, or DBS-10 pad. However, Chase and incremental redundancy can be used to generate combined soft metrics for the P0 and P1 parity bits from the first and second transmissions. In general, only the soft metrics for the P0, P1, and P2' parity bits would be used to decode the DBS-6 pad, DBS-8 pad, or DBS-10 pad retransmission of the DBS-11 RLC block. In a preferred embodiment, the turbo decoder used for DBS-6 pad, DBS-8 pad, and DBS-10 pad would be the same as that used for DBS-6, DBS-8, and DBS-10, which is defined using a 72 byte interleaver. Note that the turbo decoder definition is tied to the size of the turbo interleaver. A second decoding attempt could also be made using the soft metrics for P2 from the first transmission with the combined soft metrics for P0 and P1 from the transmission and retransmission and the turbo decoder used for DBS-11. However, this would be slightly inconsistent with the intended implementation of MCS-6 pad in which exactly the same decoder is used for MCS-6 pad as is used for MCS-6, and the first 6 bytes out of the decoder are discarded. In order to allow Chase and incremental redundancy combining of the soft metrics for P0, P1, and P2 of the first transmission using DBS-10 with soft metrics for P0', P1' and P2' of the retransmission using DBS-6 pad, DBS-8 pad, or DBS-10 pad, it would be necessary to make a modification in the definition of DBS-6 pad, DBS-8 pad and DBS-10 pad to that used for DBS-6, DBS-8, and DBS-10. The required change is indicated in FIG. 9. Note that in this definition for DBS-6 pad, DBS-8 pad, and DBS-10 pad, the turbo interleaver operates on the 68 bytes of data. However, with this change, Chase and incremental redundancy combining can now be used for the second parity stream since:

$$P0'=(0,\ldots,0,S)$$

$$P1'=(0,\ldots,0,P1)$$

$$P2'=(0,\ldots,0,P2).$$

For EGPRS, rate adaptation is a fairly slow process as compared to other technologies such as HSDPA and 1x-EVDO. Thus, the need to retransmit unpadded MCS-8 transmissions using MCS-6 pad, or MCS-3 pad due to link adaptation may be somewhat infrequent. Similarly, link adaptation for EGPRS2 can also be expected to be slow, and thus the need to retransmit unpadded DBS-11 retransmissions using DBS-6, DBS-8, or DBS-10 due to link adaptation will likely also be infrequent. However, as mentioned previously, with the introduction of EGPRS2-B, there will be instances where unpadded transmissions and padded retransmissions (and vice versa) occur frequently, and because these instances occur frequently, the efficient combining of the unpadded transmission and the padded retransmission is very important. In particular, the need to switch between padded and unpadded transmissions will arise frequently when the network is simultaneously sending data to an EGPRS2-B mobile and USF and/or PAN to an EGPRS2-A or EGPRS mobile. In such instances, the network must use DAS 5-12 or MCS 1-4 to send data to the EGPRS2-B mobile and USF and/or PAN to the EGPRS-2A mobile and must use DAS 5-7 or MCS 1-4 to send data to the EGPRS2-B mobile and USF and/or PAN to the EGPRS mobile. However, when sending data to the EGPRS2-B mobile and not sending USF and/or PAN to the EGPRS2-A mobile and/or the EGPRS mobile, the network will use only DBS 5-12 or MCS 0-4 to send data to the EGPRS mobile. As the need to signal USF and PAN to the EGPRS2-A and EGPRS mobiles will arise frequently, there will be frequent need to switch between the DBS and DAS modulation and coding schemes when sending data to the EGPRS2-B mobile. When switching between DBS and DAS modulation and coding schemes, only the following DBS and DAS modulation and coding schemes use the same RLC block size in the absence of padding:

| | | |
|---|---|---|
| B (56 bytes): | DAS-5, DAS-8 | DBS-5, DBS-7, DBS-9 |
| A pad 6 (68 bytes): | DAS-6, DAS-9, DAS-11 | DBS-11 |

When switching between the DAS-5, 8 and DBS-5, 7, 9 for transmissions and retransmissions, the use of Chase and incremental redundancy combining is seamless. Similarly, for the A pad 6 family, Chase and incremental redundancy combining is seamless between DAS-6, 9, 11 and DBS-11. The following transitions for transmissions and retransmissions are also allowed within the existing standard:

| | | |
|---|---|---|
| A pad 6 (68 bytes): | DAS-6, DAS-9, DAS-11 | DBS-11, DBS-6 pad, DBS-8 pad, DBS-10 pad |

According to the instant disclosure, it is proposed that definitions for DAS-7 pad, DAS-10 pad, and DAS-12 pad also be included in the specification, as is illustrated in Table 1. With these definitions, the following additional transitions between transmissions and retransmission will now be allowed:

| | | |
|---|---|---|
| A (74 bytes): | DAS-7 pad, DAS-10 pad DAS-12 pad | DBS-6, DBS-8, DBS-DBS-12 |

With the modification to the implementation of the padded DAS and DBS modulation and coding schemes proposed above and as illustrated in FIG. 9, use of Chase and incremental redundancy combining to combine DAS-6, 9, 11 transmissions (retransmissions) with DBS-6 pad, DBS-8 pad, and DBS-10 pad retransmission (transmissions) can be implemented. With these same modifications, Chase and incremental redundancy combining will be seamless between DBS-6, 8, 10, and 12 transmissions (retransmissions) and DAS-7 pad, DAS-10 pad, and DAS-12 pad retransmissions (transmissions). Furthermore, it should be noted that the proposed modification to the implementation of the padded DAS and DBS modulation and coding schemes would result in a minimal increase in complexity as the associated turbo interleavers and deinterleavers are already used for other DAS and DBS modulation and coding schemes.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method comprising:
   providing N bytes of data;
   interleaving the N bytes of data using a turbo-interleaver;
   pre-pending K bytes of zero padding; and
   passing the interleaved N bytes and the pre-pended K bytes to a convolutional encoder to provide an output comprising a parity sequence adapted for further processing and providing a radio link control block for an enhanced general packet radio service 2-B mobile device.

2. The method according to claim 1, wherein the radio link control block includes a data portion and a padding portion, whereby a first transmission of a radio link control block can be combined and matched with a subsequent retransmission of the radio link control block.

3. The method according to claim 1, further comprising providing the radio link control block with: an EGPRS2-A radio link control block family A pad 6 including packet data block types DAS-6, DAS-9 and DAS-11; a EGPRS2-B radio link control block family A pad 6 including packet data block types DBS-6 pad, DBS-8 pad, and DBS-10 pad, being adapted for use with Chase and incremental redundancy combining.

4. The method according to claim 1, further comprising selecting a highest data rate available consistent with a desired link quality.

5. The method according to claim 1, further comprising: matching the packet data size defining a desired number of bytes for transmission and retransmission; and selecting a highest data rate available consistent with a desired link quality.

6. The method according to claim 1, further comprising providing the radio link control block with: an EGPRS2-A radio link control block family A including packet data block types DAS-7 pad, DAS-10 pad and DAS-12 pad; a EGPRS2-B radio link control block family including packet data block types DBS-6, DBS-8, DBS-10 and DBS-12, being adapted for use with Chase and incremental redundancy combining.

7. The method according to claim 1, wherein further processing includes interleaving, puncturing and mapping.

8. The method according to claim 1, further comprising providing a signal in a header to provide notification to a mobile that a payload is a padded radio link control block.

9. The method according to claim 1, wherein the convolutional encoder provides three outputs comprising:
   a first parity sequence of K bytes of zero padding followed by N bytes of an uncoded data sequence;
   a second parity sequence that is the response of a recursive convolutional encoder to an input sequence consisting of K bytes of zero padding pre-pended N bytes of an uncoded data sequence; and
   a third parity sequence that is the response of a recursive convolutional encoder to an input sequence consisting of K bytes of zero padding pre-pended to the turbo-interleaved N bytes of uncoded data in a sequence.

10. The method according to claim 1, further comprising combining a first transmission of a radio link control block with subsequent retransmissions of the radio link control block using at least one of Chase and incremental redundancy combining.

11. The method according to claim 1, further comprising providing a switch with a first position for allowing K-bytes of zero-padding being clocked into a recursive convolutional encoder and a second position allowing N-bytes of turbo-interleaved data being clocked into the recursive convolutional encoder.

12. The method according to claim 1, further comprising passing K-bytes of zero-padding being clocked into a recursive convolutional encoder at a first time and passing N-bytes of turbo-interleaved data being clocked into the recursive convolutional encoder at a second time.

13. The method according to claim 1, further comprising passing K-bytes of zero-padding being clocked into a recursive convolutional encoder at a first time and passing N-bytes of turbo-interleaved data being clocked into the recursive convolutional encoder at a second time, and an output of a second recursive convolutional encoder is a third parity sequence P2".

14. A method comprising;
   demodulating a padded radio link control block;
   generating metrics for each systematic and parity bit contained in the padded radio link control block;
   discarding the systematic and parity bit corresponding to encoded padding; and
   in the event of a first transmission turbo decoding and in the event of a re-transmission, combining the systematic and parity bit with those of previous transmissions using Chase and incremental redundancy combining and then turbo decoding.

15. The method according to claim 14, wherein the generating step includes demapping, depuncturing and deinterleaving.

16. An apparatus comprising:
   a controller configured to control operations of the apparatus;
   a transceiver coupled to the controller, the transceiver configured to send and receive signals; and
   a radio link control module coupled to the controller, the radio link control module configured to: demodulate a padded radio link control block; generate metrics for each systematic and parity bit contained in the padded radio link control block; discard the systematic and parity bit corresponding to encoded padding; and in the event of a first transmission, turbo decode and in the event of a re-transmission, combine parity metrics with those of previous transmissions using Chase and incremental redundancy combining and then turbo decode.

17. The apparatus according to claim 16, wherein the radio link control module is further configured to demap, depuncture and deinterleave.

* * * * *